United States Patent
Hijikata

(10) Patent No.: US 9,685,895 B2
(45) Date of Patent: Jun. 20, 2017

(54) MOTOR CURRENT CONTROLLER AND METHOD FOR CONTROLLING MOTOR CURRENT

(71) Applicant: MINEBEA CO., LTD., Kitasaku-Gun, Nagano (JP)

(72) Inventor: Hidetoshi Hijikata, Hamamatsu (JP)

(73) Assignee: Minebea Co., Ltd., Nagano (JP)

( * ) Notice: Subject to any disclaimer, the term of this patent is extended or adjusted under 35 U.S.C. 154(b) by 24 days.

(21) Appl. No.: 15/007,469

(22) Filed: Jan. 27, 2016

(65) Prior Publication Data

US 2016/0218649 A1 Jul. 28, 2016

(30) Foreign Application Priority Data

Jan. 28, 2015 (JP) ................................. 2015-014796

(51) Int. Cl.
*H02P 8/12* (2006.01)
*H02M 7/48* (2007.01)
*H02P 8/32* (2006.01)

(52) U.S. Cl.
CPC . *H02P 8/12* (2013.01); *H02P 8/32* (2013.01)

(58) Field of Classification Search
USPC .............. 318/293, 294, 430–434, 685, 696
See application file for complete search history.

(56) References Cited

U.S. PATENT DOCUMENTS

| 5,818,178 A * | 10/1998 | Marumoto | H02P 7/04 318/400.29 |
| 6,049,184 A * | 4/2000 | Uggla | H02P 8/18 318/254.2 |
| 6,066,930 A * | 5/2000 | Horiguchi | H02P 7/04 318/400.29 |
| 6,943,514 B1 * | 9/2005 | Chen | H02P 7/29 318/400.09 |
| 9,614,470 B2 * | 4/2017 | Hijikata | H02P 8/12 |

FOREIGN PATENT DOCUMENTS

JP 2002-204150 A 7/2002

\* cited by examiner

*Primary Examiner* — Bentsu Ro
(74) *Attorney, Agent, or Firm* — Carrier Blackman & Associates, P.C.; Joseph P. Carrier; William D. Blackman

(57) ABSTRACT

A motor current controller operates to: set a reference current value and a decay mode switching time for each PWM cycle based on a positional relationship between a rotor and a stator; switch an H-bridge circuit to the charge mode at the time of start of each PWM cycle; switch the H-bridge circuit to the fast decay mode and store a charge mode time when determined that the motor current is greater than the reference current value; switch the H-bridge circuit to the slow decay mode when the decay mode switching time elapses; compare the charge mode time of the corresponding PWM cycle in a present falling side with the charge mode time of the PWM cycle in a previous falling side; update the decay mode switching time of the PWM cycle previous to the corresponding PWM cycle in a subsequent falling side.

5 Claims, 13 Drawing Sheets

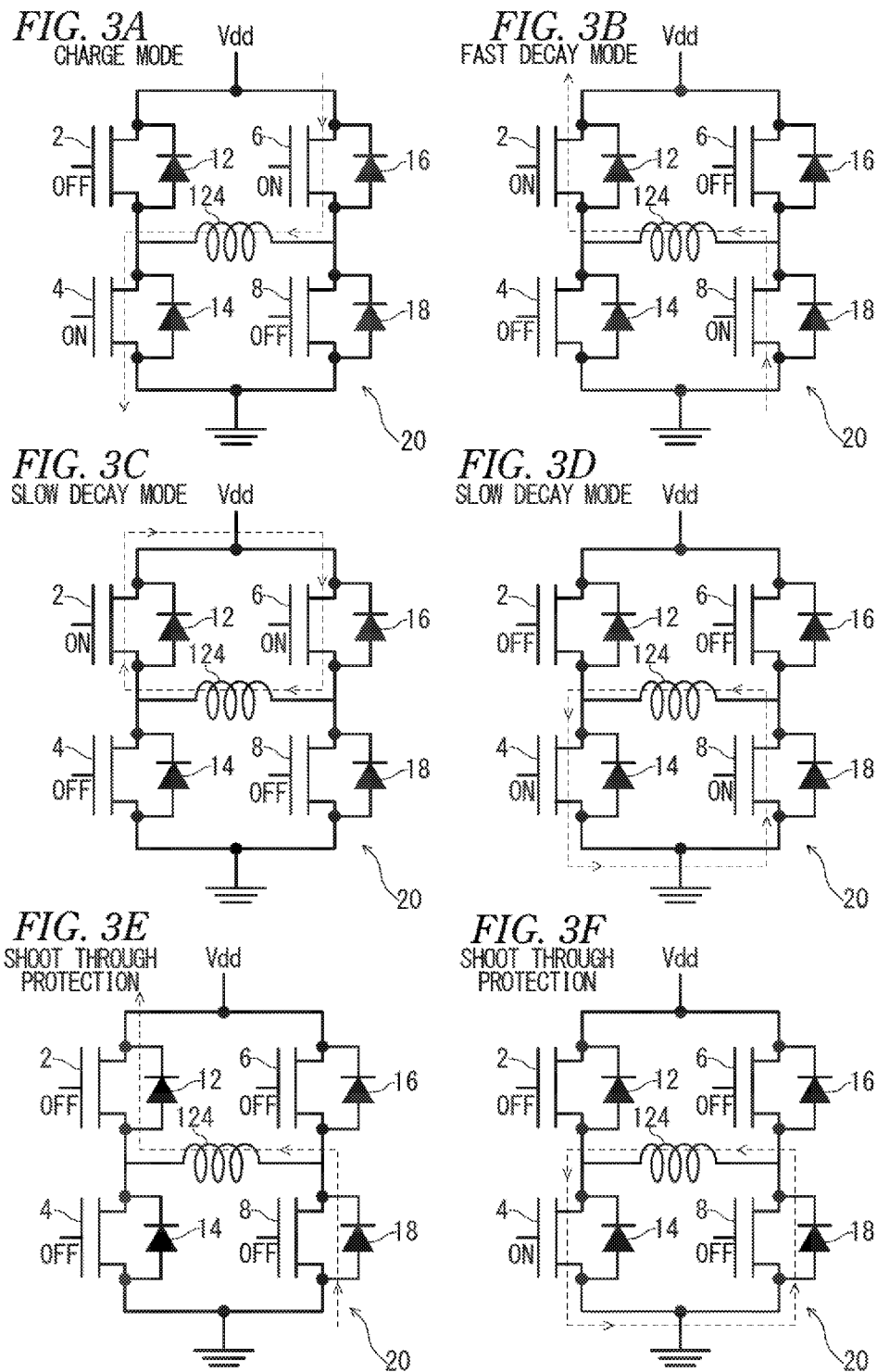

*FIG. 5*

| PWM CYCLE NUMBER | 1 | 2 | 3 | ... | n |
|---|---|---|---|---|---|
| PREVIOUS CHARGE MODE TIME TON_o | $TON\_o_1$ | $TON\_o_2$ | $TON\_o_3$ | ... | $TON\_o_n$ |
| PRESENT CHARGE MODE TIME TON | $TON_1$ | $TON_2$ | $TON_3$ | ... | $TON_n$ |
| DECAY MODE SWITCHING TIME Tfs | $Tfs_1$ | $Tfs_2$ | $Tfs_3$ | ... | $Tfs_n$ |

MOTOR CURRENT CONTROLLER AND METHOD FOR CONTROLLING MOTOR CURRENT

BACKGROUND OF THE INVENTION

1. Field of the Invention

The present invention relates to a motor current controller and a method for controlling motor current which are suitable to be implemented for controlling a stepping motor.

2. Description of the Related Art

When an inductive load such as a motor coil is current-driven by an H-bridge circuit, pulse width modulation (PWM) control is often used. The PWM control is to control a current in a load by repeating charge and discharge of the current.

An example of motor drive using the PWM control is described, for example, in JP-A-2002-204150. In the abstract of JP-A-2002-204150, it is described that the problem to be solved by the disclosure is: "to suppress pulsation of load current by performing accurate current control when constant current control is performed by repeating charge/discharge of a current for a reactance load through an H-bridge circuit mounted on an IC." It is also described that the solution for the problem is: "The semiconductor integrated circuit comprises an H-bridge circuit for driving a coil load L being connected with a pair of external output terminals 15 and 16, a PWM control circuit 20 for driving the switching of output switch elements 11-14 in the H-bridge circuit with a PWM signal and setting a charge mode, a slow decay mode or a fast decay mode of the H-bridge circuit selectively for the load, a first current detection circuit 21 for detecting a load current dropping below a first set level in fast decay mode for the load, and an output control logic circuit 23 for controlling a PWM control circuit by receiving a detection output from the first current detection circuit 21 and generating a control signal for making a switch to the slow decay mode."

As one of the above-mentioned motor driving method, a micro-step drive method is known which has small residual vibration and excellent stability when a rotor rotates particularly at a low speed. In this method, field effect transistors (FETs) which are switching elements of the H-bridge circuit are subjected to the PWM control to match a motor current with a reference current curve (hereinafter, referred to as a "reference current") having a substantially sinusoidal wave shape which is induced from the positional relationship between a rotor and a stator, thereby realizing constant current control. A basic step angle (for example, one turn) is divided into 1/n and the reference current is changed every the divided angle periods. These angle periods are referred to as micro-steps and each have one or more PWM cycles. That is, a microcomputer or the like can easily generate a stepwise current which varies in a stepwise manner.

However, during a state where the motor current is falling, a current waveform in the charge mode varies depending on a drive voltage, a rotation speed, a load torque condition, or the like of a motor. Since inductance of the coil varies depending on the positional relationship between the rotor and the stator and it is thus difficult to control the motor current waveform using the current detection circuit, a decay speed of the motor current during discharge may cause current ripples (current fluctuation) of the motor current. The current ripples cause torque loss, vibration, or noise of the motor. Frequent switching of a coil voltage and current-supply direction between the charge mode and the fast decay mode may cause electromagnetic noise.

In the technique described in JP-A-2002-204150, two comparators are provided to compare a measured current value with two reference values and the operation mode is switched based on the comparison result and/or the time. As another technique, it can also be considered that the ripples are suppressed by increasing the number of steps divided in the micro-step drive to shorten the PWM cycle. However, as described in JP-A-2002-204150, addition of two comparators causes an increase in cost. Since the shortening of the PWM cycle excessively increases the load of the microcomputer, it is necessary to use a dedicated motor driver or a high-cost microcomputer, thereby causing an increase in cost.

SUMMARY OF THE INVENTION

One of objects of the present invention is to provide a motor current controller and a method for controlling motor current that can suitably control a motor current to follow a target value with a low-cost configuration.

According to an illustrative embodiment of the present invention, there is provided a motor current controller including: an H-bridge circuit that includes a switching element and is connected to a motor coil provided in a motor; and a control unit that drives the switching element every PWM cycle and designates any operation mode from among a plurality of modes including a charge mode, in which a motor current flowing in the motor coil increases, a fast decay mode, in which the motor current is decreased, and a slow decay mode, in which the motor current is decreased at a speed lower than that in the fast decay mode, for the H-bridge circuit. The control unit is configured to perform a series of process including: setting a reference current value and a decay mode switching time for each PWM cycle based on a positional relationship between a rotor and a stator; switching the H-bridge circuit to the charge mode at the time of start of each PWM cycle; determining whether the motor current is greater than the reference current value; switching the H-bridge circuit to the fast decay mode and storing a charge mode time when determined that the motor current is greater than the reference current value; switching the H-bridge circuit to the slow decay mode when the decay mode switching time elapses after a time point at which the H-bridge circuit is switched to the fast decay mode; comparing the charge mode time of the corresponding PWM cycle in a present falling side with the charge mode time of the PWM cycle having the same number as the corresponding PWM cycle in a previous falling side; and updating, based on a result of the comparing of the charge modes, the decay mode switching time of the PWM cycle previous to the corresponding PWM cycle in a subsequent falling side.

According to another illustrative embodiment of the present invention, there is provided a method for controlling motor current of a motor current controller having an H-bridge circuit that includes a switching element and is connected to a motor coil provided in a motor and a control unit that drives the switching element every PWM cycle and designates any operation mode from among a plurality of modes including a charge mode, in which a motor current flowing in the motor coil increases, a fast decay mode, in which the motor current is decreased, and a slow decay mode, in which the motor current is decreased at a speed lower than that in the fast decay mode, for the H-bridge circuit. The method includes: setting a reference current value and a decay mode switching time for each PWM cycle based on a positional relationship between a rotor and a stator; switching the H-bridge circuit to the charge mode at the time of start of each PWM cycle; determining whether the motor current is greater than the reference current value; switching the H-bridge circuit to the fast decay mode and storing a charge mode time when determined that the motor current is greater than the reference current value; switching the H-bridge circuit to the slow decay mode when the decay mode switching time elapses after a time point at which the H-bridge circuit is switched to the fast decay mode; comparing the charge mode time of the corresponding PWM cycle in a present falling side with the charge mode time of the PWM cycle having the same number as the corresponding PWM cycle in a previous falling side; and updating, based on a result of the comparing of the charge modes, the decay mode switching time of the PWM cycle previous to the corresponding PWM cycle in a subsequent falling side.

BRIEF DESCRIPTION OF THE DRAWINGS

In the accompanying drawings:

FIGS. 3A to 3F are diagrams illustrating operation modes of an H-bridge circuit;

FIG. 5 is a diagram illustrating current control data of each PWM cycle in a falling side to be controlled;

DETAILED DESCRIPTION

Figure 1:
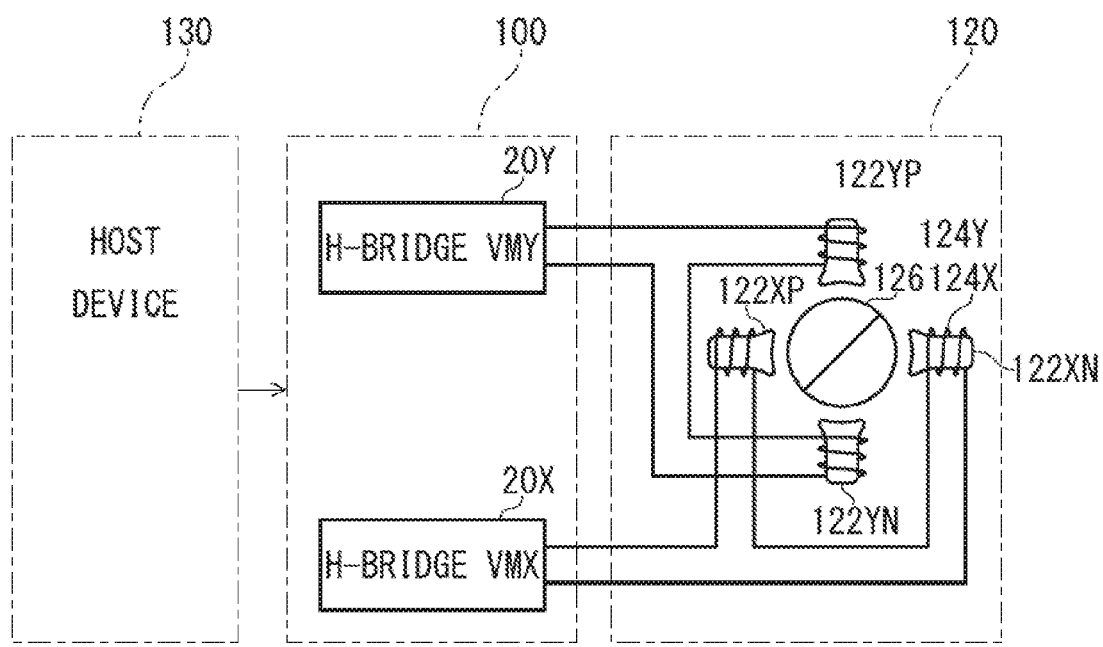
FIG. 1 is a block diagram illustrating an entire configuration of a motor control system according to an embodiment of the present invention.

Hereinafter, an embodiment of the present invention will be described in detail with reference to the accompanying drawings. FIG. 1 is a block diagram illustrating an entire configuration of a motor control system according to the embodiment. As shown in FIG. 1, a motor 120 is a bipolar two-phase stepping motor and includes a rotor 126 including a permanent magnet and formed to be rotatable and stators formed at four section positions in the circumferential direction of the rotor 126. The stators include X-phase stators 122XP and 122XN and Y-phase stators 122YP and 122YN. The stator 122XP and the stator 122XN are located on the opposite sides with the rotor 126 interposed therebetween. The stator 122YP and the stator 122YN are located on the opposite sides with the rotor 126 interposed therebetween and are perpendicular to the stator 122XP and the stator 122XN. A winding is wound on each stator in the same direction. The windings wound on the stators 122XP and 122XN are connected in series and both windings are referred to as a "stator winding 124X". Similarly, the windings wound on the stators 122YP and 122YN are connected in series and both windings are referred to as a "stator winding 124Y".

A host device 130 outputs a speed command signal indicating a rotation speed of the motor 120. A motor controller 100 (an example of a motor current controller) controls driving of the motor 120 in accordance with the speed command signal. The motor controller 100 is provided with H-bridge circuits 20X and 20Y and applies an X-phase voltage VMX and a Y-phase voltage VMY to the stator windings 124X and 124Y, respectively.

Figure 2:
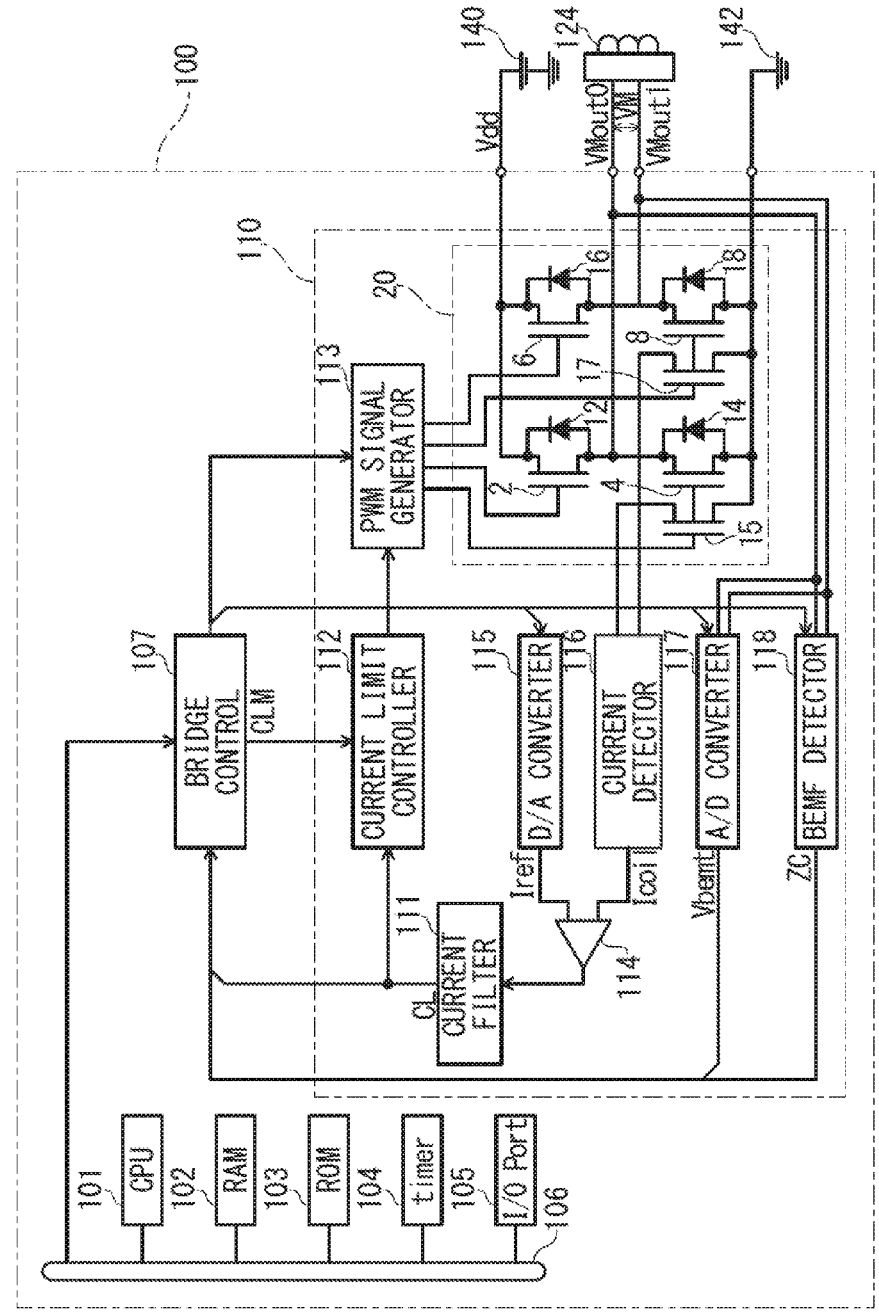
FIG. 2 is a block diagram illustrating a detailed configuration of a motor controller.

FIG. 2 is a block diagram illustrating a detailed configuration of the motor controller 100. In FIG. 1, two sets of stator windings 124X and 124Y and two sets of H-bridge circuits 20X and 20Y are illustrated. However, in FIG. 2, these H-bridge circuits are collectively shown as only one set of stator winding 124 and one set of H-bridge circuit 20 for the purpose of simplification.

A central processing unit (CPU) 101, which is installed in the motor controller 100, controls other modules via a bus 106 based on a control program stored in a read only memory (ROM) 103. A random access memory (RAM) 102 is used as a work memory of the CPU 101. A timer 104 measures an elapsed time from a reset timing under the control of the CPU 101. An I/O port 105 inputs and outputs a signal between the host device 130 illustrated in FIG. 1 or an external device. A bridge controller 107 controls a bridge control circuit 110 based on a command from the CPU 101. A current limit controller 112 controls a PWM signal generator 113 so as to limit a current if necessary.

The bridge control circuit 110 is configured as a single integrated circuit. The PWM signal generator 113 therein generates and supplies a PWM signal to the H-bridge circuit 20 under the control of the bridge controller 107. The H-bridge circuit 20 includes switching elements 2, 4, 6, 8, 15, and 17 which are, for example, field effect transistors (FETs). The PWM signal is an ON/OFF signal which is applied as a gate voltage to the switching elements 2, 4, 6, 8, 15, and 17. In the drawing, a lower terminal of each of the switching elements 2, 4, 6, 8, 15, and 17 is a source terminal and an upper terminal thereof is a drain terminal.

The switching elements 2 and 4 are connected in series, and the series circuit is connected to a DC power source 140 and a ground line 142 and is supplied with a predetermined voltage Vdd. Similarly, the switching elements 6 and 8 are connected in series, and the series circuit is supplied with the voltage Vdd. Diodes 12, 14, 16, and 18 are reflux diodes and are connected in parallel to the switching elements 2, 4, 6, and 8. The switching elements 15 and 17 are formed to detect a current and constitute current mirror circuits along with the switching elements 4 and 8, respectively. Accordingly, currents proportional to the currents flowing in the switching elements 4 and 8 flow in the switching elements 15 and 17, respectively. The switching elements 2, 4, 6, and 8 may use their parasitic diodes instead of the reflux diodes.

A voltage VMout0 of a connection point between the switching elements 2 and 4 is applied to one end of the stator winding 124 of the motor 120. A voltage VMout1 of a connection point between the switching elements 6 and 8 is applied to the other end of the stator winding 124. Accordingly, a motor voltage VM(=voltage VMout0−VMout1) which is a difference therebetween is applied to the stator winding 124. The motor voltage VM actually includes an X-phase voltage VMX and a Y-phase voltage VMY illustrated in FIG. 1.

A current detector 116 outputs a measured current value Icoil of the current flowing in the stator winding 124 by measuring the current value flowing in the switching elements 15 and 17 depending on the current direction. A D/A converter 115 receives a digital value of a reference current value Iref from the bridge controller 107 and converts the received digital value into an analog value. A comparator 114 compares the measured current value Icoil as an analog value with the reference current value Iref, outputs a signal of "1" when the measured current value is equal to or greater than the reference current value, and outputs a signal of "0" otherwise.

Chattering may occur in the output signal of the comparator 114 due to an influence of noise or the like. A current filter 111 is provided to exclude the chattering. That is, when the output signal of the comparator 114 is switched, the current filter 111 waits for a predetermined filter time Tf and determines again whether the output signal of the comparator 114 is held in the switched value. When the determination result is positive, the current filter 111 outputs the switched value of the output signal as a threshold excess flag CL.

The voltages VMout0 and VMout1 are also supplied to an A/D converter 117 and a back electromotive force (BEMF) detector 118. The A/D converter 117 measures and outputs a back electromotive force Vbemf of the stator winding 124 based on the voltages VMout0 and VMout1. The back electromotive force Vbemf is used to detect loss of synchronism. The BEMF detector 118 outputs a flag ZC in response to switching of a voltage direction (zero cross) when the motor voltage VM is a back electromotive force, that is, in a period in which a voltage is not applied from the H-bridge circuit 20 to the stator winding 124.

The bridge controller 107 outputs a current control enable flag CLM. The current control enable flag CLM is set to "1" when changing of the PWM signal supplied to the H-bridge circuit 20 is enabled, and is set to "0" when the changing is disabled. Specifically, the current control enable flag CLM is "1" between time Tcs and time Tce after the PWM cycle starts. The current limit controller 112 controls the PWM signal generator 113 so as to hold the present PWM signal when the current control enable flag CLM is "0".

FIGS. 3A to 3F are diagrams illustrating operation modes of the H-bridge circuit 20.

FIG. 3A is a diagram illustrating a charge mode of the H-bridge circuit 20.

When the absolute value of the motor current flowing in the stator winding 124 increases, for example, the switching elements 4 and 6 diagonally facing each other are switched to an ON state and the other switching elements 2 and 8 are switched to an OFF state. In this state, the motor current flows in the direction indicated by a broken line via the switching element 6, the stator winding 124, and the switching element 4, and the motor current increases. This operation mode is referred to as a "charge mode". When the motor current is decreased at a high speed from this state, the charge mode transitions to a fast decay mode illustrated in FIG. 3B.

FIG. 3B is a diagram illustrating a fast decay mode of the H-bridge circuit 20. When the absolute value of the motor current flowing in the stator winding 124 is decreased at a high speed, the switching elements 4 and 6 diagonally facing each other are switched to the OFF state and the other switching elements 2 and 8 are switched to the ON state to the contrary to the previous charge mode. Since a back electromotive force is generated in the stator winding 124, a current flows in the direction indicated by a broken line via the switching element 8, the stator winding 124, and the switching element 2 and the motor current is decreased at a high speed. This operation mode is referred to as a "fast decay mode".

When the current is decreased at a low speed from the charge mode illustrated in FIG. 3A or the fast decay mode illustrated in FIG. 3B, the operation mode transitions to a slow decay mode illustrated in FIG. 3C.

FIG. 3C is a diagram illustrating a slow decay mode of the H-bridge circuit 20. When the absolute value of the motor current flowing in the stator winding 124 is decreased at a speed lower than that in the fast decay mode, the switching elements 2 and 6 on the voltage Vdd side are switched to the ON state and the switching elements 4 and 8 on the ground potential side are switched to the OFF state. Then, as indicated by the broken line, a current looping around the switching elements 2 and 6 and the stator winding 124 flows. This current is decreased by the impedance of the switching elements 2 and 6 and the stator winding 124. The decay speed at this time is lower than that in the fast decay mode. This operation mode is referred to as a "slow decay mode".

FIG. 3D is a diagram illustrating a variation of the slow decay mode of the H-bridge circuit 20.

When the absolute value of the motor current flowing in the stator winding 124 is decreased at a speed lower than that in the fast decay mode, the switching elements 2 and 6 on the voltage Vdd side may be switched to the OFF state and the switching elements 4 and 8 on the ground potential side may be switched to the ON state. Then, as indicated by the broken line, a current looping around the switching elements 4 and 8 and the stator winding 124 flows. This current is decreased by the impedance of the switching elements 4 and 8 and the stator winding 124. The decay speed at this time is lower than that in the fast decay mode.

Even when the gate voltage of a certain switching element is switched to the OFF state, the switching element stays in the ON state for a while due to the parasitic capacitance of the gate of the switching element. Accordingly, for example, when the operation mode is instantaneously switched from the charge mode (FIG. 3A) to the fast decay mode (FIG. 3B), all the switching elements are instantaneously set to the ON state, and the voltage Vdd and the ground potential may be short-circuited to break down the switching elements. In order to prevent this situation, the H-bridge circuit 20 is set to an operation mode called a "shoot through protection mode".

FIG. 3E illustrates a shoot through protection mode in which all the switching elements 2, 4, 6, and 8 are set to the OFF state.

When the operation mode is switched from the charge mode illustrated in FIG. 3A to the shoot through protection mode illustrated in FIG. 3E, a back electromotive force is generated in the stator winding 124 and thus the motor current flows in the direction indicated by a broken line via the diode 18, the stator winding 124, and the diode 12. In the shoot through protection mode illustrated in FIG. 3E, since power loss occurs due to forward voltage drop of the diodes 12 and 18, the decay speed of the motor current is the highest.

When the charge mode illustrated in FIG. 3A and the slow decay mode illustrated in FIG. 3D are compared, the switching element 4 is in the ON state in any mode. Accordingly, when the operation mode is switched from the state illustrated in FIG. 3A to the state illustrated in FIG. 3D, it does not cause any problem that the switching element 4 is held in the ON state. Therefore, in this case, the shoot through protection mode in which the switching element 4 is set to the ON state and the switching elements 2, 6, and 8 are set to the OFF state can be employed as illustrated in FIG. 3F. In this case, the motor current looping around the switching element 4, the diode 18, and the stator winding 124 flows as indicated by the broken line in the drawing.

In the state illustrated in FIG. 3F, since power loss due to the forward voltage drop of the diode 18 is generated, the decay speed is higher than that in the slow decay mode, but the decay speed is much lower than that in the fast decay mode or the shoot through protection mode illustrated in FIG. 3E. When the operation mode is switched from the charge mode or the fast decay mode to the slow decay mode, it means that "it is not intended to greatly decrease the motor current", and thus the shoot through protection mode in which only one switching element is set to the ON state is selected as illustrated in FIG. 3F.

In FIG. 2, the operation mode which is designated to the bridge controller 107 from the CPU 101 is one of the charge mode, the slow decay mode, and the fast decay mode, and the shoot through protection mode is not explicitly designated in a control program to be described later. However, the bridge controller 107 does not immediately reflect the designated operation mode but controls the PWM signal generator 113 by necessarily inserting the shoot through protection mode (FIG. 3E or 3F) therebetween.

Figure 4A:
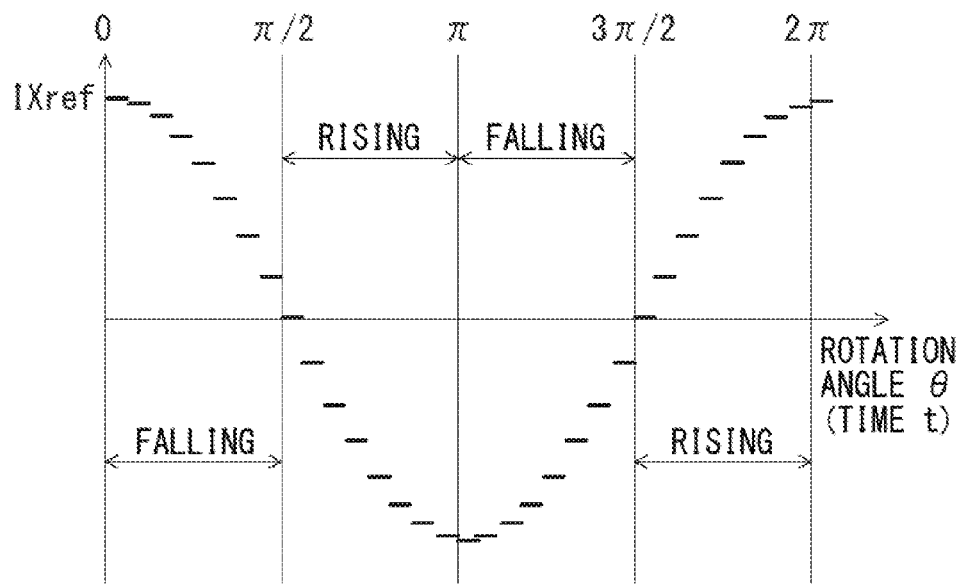
FIGS. 4A and 4B are waveform diagrams of a reference current value with respect to a rotation angle of a motor.
Figure 4B:
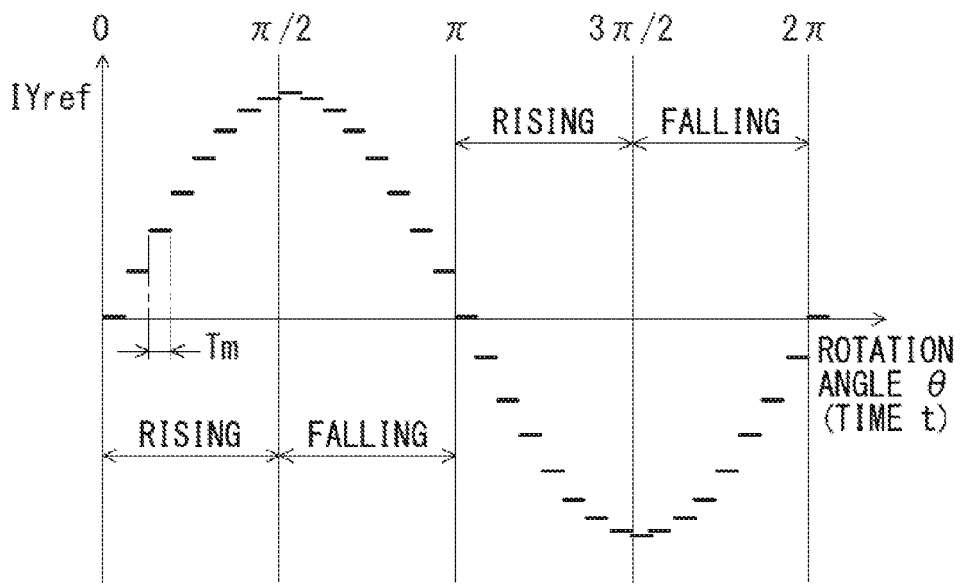

In FIG. 2, the reference current value Iref supplied from the bridge controller 107 to the D/A converter 115 actually includes an X-phase reference current value IXref and a Y-phase reference current value IYref. Setting examples of the reference current values IXref and IYref in one turn of the stepping motor 120, that is, in a range in which the rotation angle θ ranges from 0 to 2π, are illustrated in FIGS. 4A and 4B. As illustrated in the drawings, the reference current values IXref and IYref have waveforms obtained by approximating a cosine curve and a sine curve using a stepwise wave. A system in which the reference current values IXref and IYref are determined in this way to drive the motor 120 is referred to as a micro-step system, and has features of small residual vibration and excellent stability particularly at the time of low-speed rotation.

A cycle in which the stepwise wave varies is referred to as a micro-step cycle Tm. It is preferable that the micro-step cycle Tm be equal to the PWM cycle or an integral multiple thereof. In the reference current values IXref and IYref, a rising side and a falling side are alternately repeated every π/2 of the rotation angle θ as illustrated in the drawings. Here, the "rising side" is a side in which the absolute values of the reference current values IXref and IYref rise, and the "falling side" is a side in which the absolute values fall.

FIG. 5 is a diagram illustrating current control data of each PWM cycle in the falling side to be controlled. The current control data is stored, for example, in the bridge controller 107. The bridge controller 107 stores a charge mode time TON_o in a previous falling side and a charge mode time TON and a decay mode switching time Tfs in a present falling side, which are prepared based on the positions of the rotor and the stator corresponding to the number of PWM cycles in the present falling side, in a memory in advance. The current control data includes a PWM cycle number indicating the order of a PWM cycle, the charge mode time TON_o in the previous rotation period, and the charge mode time TON and the decay mode switching time Tfs in the present rotation period. The PWM cycle number indicates the number of the PWM cycle synchronized with the rotation of the motor. The previous rotation period refers to the previous falling side. Therefore, the charge mode time TON_o indicates the time of the charge mode in each PWM cycle in the previous falling side.

The present rotation period refers to the present falling side. Accordingly, the charge mode time TON indicates the time of the charge mode in each PWM cycle in the present falling side. The decay mode switching time Tfs refers to the timing at which the fast decay mode or the charge mode is switched to the slow decay mode in the PWM cycle in the falling side. The bridge controller 107 stores the current control data of each PWM cycle in advance and dynamically rewrites the current control data with additional rotational driving.

Figure 6:
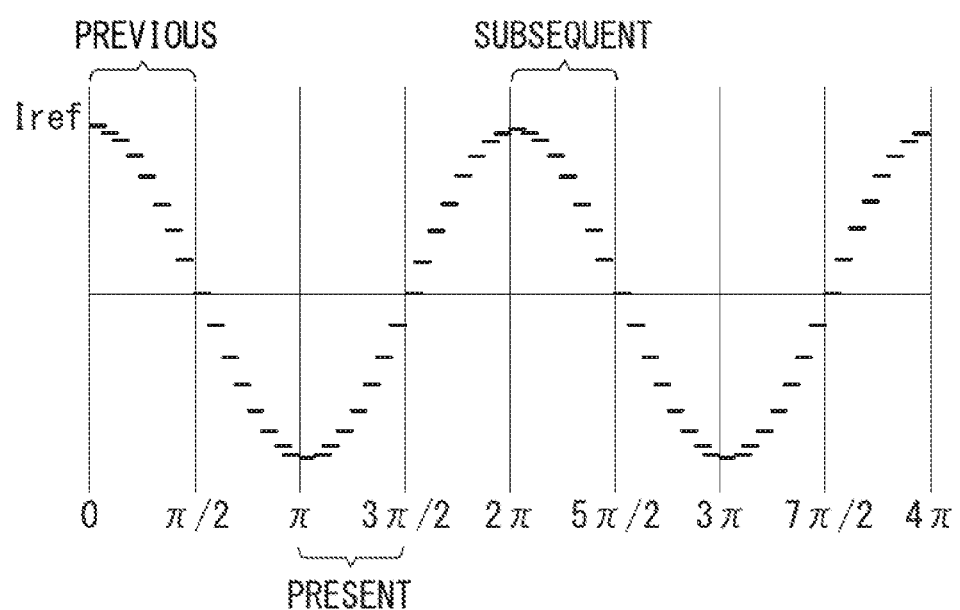
FIG. 6 is a diagram illustrating a falling side to be controlled.

FIG. 6 is a graph illustrating the falling side to be controlled. The vertical axis of the graph represents the reference current value Iref. The horizontal axis of the graph represents the rotation angle θ. When the rotation angle θ in the present falling side ranges from π to 3π/2, the rotation angle θ of the previous falling side ranges 0 to π/2 which lags by a half turn. The rotation angle θ in a subsequent falling side ranges from 2π(to 5π/2 which advances by a half turn. That is, the previous falling side lags by a half turn with respect to the present falling side. The subsequent falling side advances by a half turn with respect to the present falling side.

The rotation angle θ and the PWM cycle of the motor 120 are synchronized such that the same PWM cycle number has the same rotation angle θ in any falling side. Accordingly, the motor currents in the PWM cycles having the same number in different falling sides can be compared with each other.

The previous falling side may be offset by one turn (2n) from the present falling side and the subsequent falling side may be offset by one turn (2n) with respect to the present falling side. At this time, the present falling side lags by one turn with respect to the previous falling side. The subsequent falling side advances by one turn with respect to the present falling side. Accordingly, even when the rotor has asymmetry, a suitable control can be performed.

The previous falling side may be offset by an integral multiple (nπ) of the half turn from the present falling side and the subsequent falling side may be offset by an integral multiple (nπ) of the half turn with respect to the present falling side. For example, when periodic disturbance is generated every two turns of the motor, it is possible to suitably suppress the disturbance.

Figure 7:
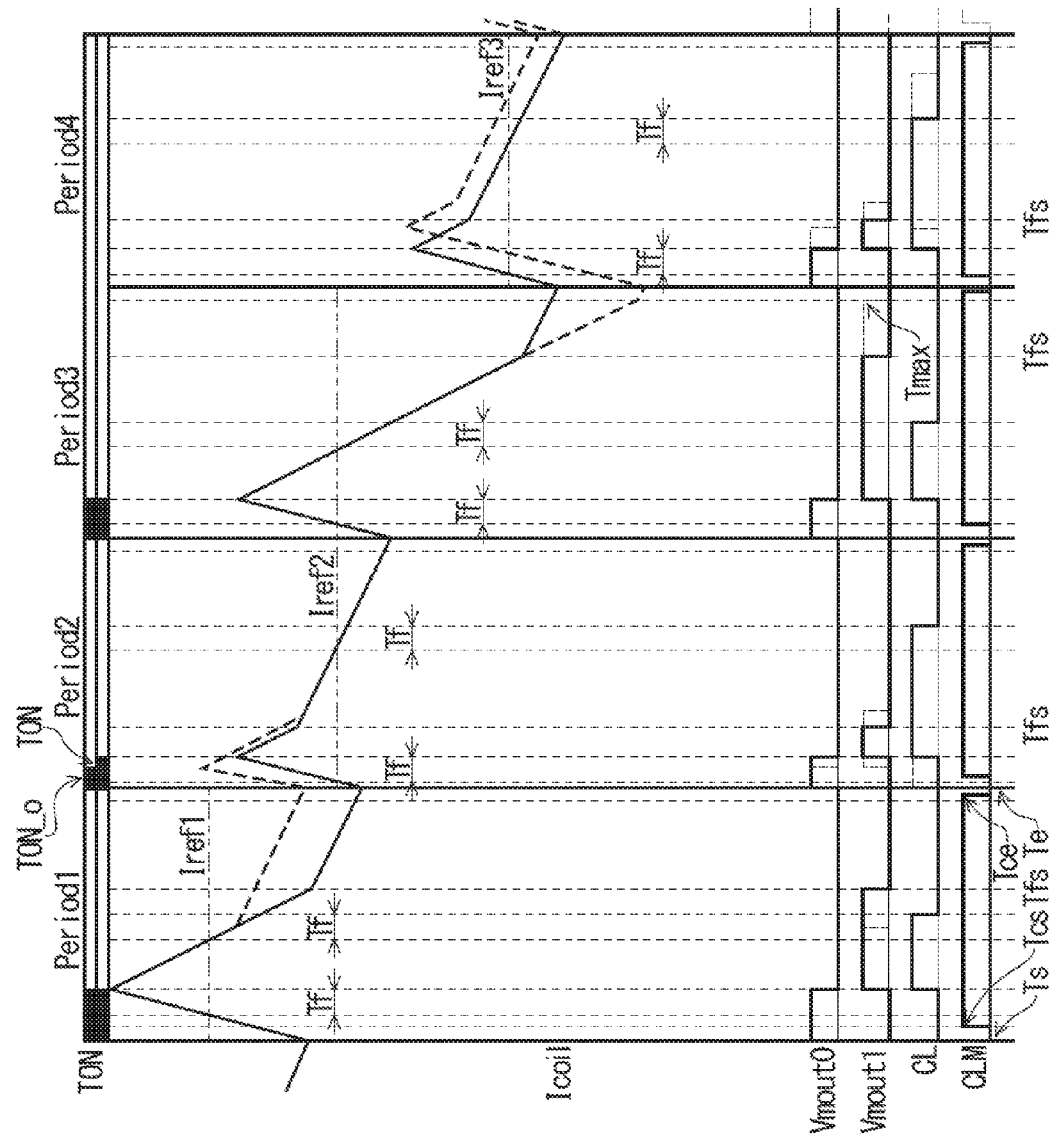
FIG. 7 is a diagram illustrating an example of the PWM cycle in a falling side to be controlled.

FIG. 7 is a diagram illustrating an example of the PWM cycle in the falling side to be controlled. In FIG. 7, four PWM periods of Period 1 to Period 4 are illustrated.

In the uppermost part in FIG. 7, a period in which the operation modes in the previous falling side is the charge mode is indicated by a black line and indicates a section in which a charge mode flag Ton is 1. In the second uppermost part in FIG. 7, a period in which the operation mode in which the present falling side is the charge mode is indicated by a black line.

The third uppermost part in FIG. 7 illustrates a waveform diagram of the measured current value Icoil, and the reference current values Iref1 to Iref3 are indicated by a two-dot chained line. The solid line indicates the measured current value Icoil in the present falling side and the broken line indicates the measured current value Icoil in the previous falling side.

Hereinafter, when the reference current values Iref1 to Iref3 are not particularly distinguished, the reference current values are simply referred to as a reference current value Iref. As indicated by Period 2 and Period 3, the reference current value Iref2 may be equal in plural continuous PWM cycles.

The fourth and fifth uppermost parts in FIG. 7 illustrate waveform diagrams of the voltages VMout0 and VMout1.

The sixth uppermost part in FIG. 7 illustrates a threshold excess flag CL which is an internal state of the bridge controller 107. The seventh uppermost part in FIG. 7 illustrates a current control enable flag CLM which is an internal output of the bridge controller 107. In the waveform diagrams, the solid lines represent values in the present falling side and the broken lines represent values in the previous falling side.

First, the operation in the previous falling side in Period 1 to Period 2 will be described below.

The time Ts is a timing at which the present PWM cycle starts. When each PWM cycle starts, the current control enable flag CLM begins with "0" which is set to the time Tce of the previous PWM cycle and the H-bridge circuit 20 operates in the charge mode. At this time, the voltage VMout0 has a level of the voltage Vdd and the voltage VMout1 has a ground level. The charge mode flag Ton is switched to "1". The threshold excess flag CL is "0".

In the time Tcs subsequent to the time Ts, the current control enable flag CLM is switched to "1". Accordingly, the current limit controller 112 controls the PWM signal generator 113 so as to enable changing of the PWM signal. The current control enable flag CLM is held in "1" up to the time Tce to be described later.

When the measure current value Icoil is greater than the reference current value Iref1 after the time Tcs and the filter time Tf elapses additionally, the threshold excess flag CL is switched to "1". When the threshold excess flag CL is switched to "1", the charge mode ends and the charge mode flag Ton is switched to "0".

The charge mode time TON represents the time in which the charge mode is held. The difference of the measured current value Icoil from the reference current value Iref1 can be measured using the charge mode time TON. The charge mode time TON is a time in which the charge mode flag Ton is set to "1".

After the charge mode ends, the H-bridge circuit 20 is switched to the fast decay mode. At this time, the voltage VMout0 has the ground level. The voltage VMout1 has the level of the voltage Vdd. The threshold excess flag CL is "1".

Thereafter, when the measured current value Icoil becomes less than the reference current value Iref1 and the filter time Tf elapses additionally, the threshold excess flag CL is switched to "0".

In the decay mode switching time Tfs, the H-bridge circuit 20 is switched to the slow decay mode. At this time, the voltages VMout0 and VMout1 have the ground level. The decay mode switching time Tfs employ different values depending on the PWM cycles. By appropriately setting the decay mode switching time Tfs, it is possible to appropriately decrease the motor current in each PWM cycle and thus to approximate the motor current to the reference current value Iref. The decay mode switching time Tfs is greater than the time Tcs and less than the time Tmax to be described later.

In the time Tce, the current control enable flag CLM is switched to "0". Accordingly, the current limit controller 112 does not enable changing of the PWM signal and always controls the PWM signal generator 113 in the slow decay mode. In Period 1, since the H-bridge circuit 20 is already in the slow decay mode, the operation mode is not switched.

The time Te is a timing at which the PWM cycle of Period 1 ends and is the same timing as the time Ts at which the PWM cycle of Period 2 starts. Thereafter, the same PWM cycle as in Period 1 is performed.

The difference from the operation in the previous falling side indicated by the broken line in Period 1 and Period 2 will be described below. In the previous falling side, the H-bridge circuit 20 is switched from the fast decay mode to the slow decay mode earlier than the present falling side. At the timing at which the PWM cycle of Period 2 starts, the measured current value Icoil has a value less than that in the previous falling side and is brought close to the reference current value Iref2. The charge mode time in the previous falling side of Period 2 is shorter than the charge mode time in the present falling side.

The operation in the previous falling side of Period 3 and Period 4 will be described below.

As can be seen from the measured current value Icoil in the previous falling side indicated by the broken line in Period 3, the H-bridge circuit 20 is first switched to the slow decay mode in the time Tmax. That is, the time Tmax is the same as the decay mode switching time Tfs.

As can be seen from the measured current value Icoil in the present falling side indicated by the solid line, the H-bridge circuit 20 is switched to the slow decay mode in the decay mode switching time Tfs earlier than that in the previous falling side. Accordingly, the measured current value Icoil gets closer to the reference current value Iref3 than that in the previous falling side.

This is because the measured current value Icoil prior by one step (prior by one PWM cycle, that is, Period 3) in the present falling side is decreased less and thus the charge mode starts from a greater current value in Period 4. On the contrary, when the charge mode time TON is short, it means that the measured current value Icoil prior by one step is decreased less. That is, it is possible to determine decay of the coil current based on the charge mode time TON.

As illustrated in Period 3 and Period 4, when the decay mode switching time Tfs is long, the period of the fast decay mode is elongated and the measured current value Icoil is decreased more. On the contrary, when the decay mode switching time Tfs is short, the period of the fast decay mode is shortened and the measured current value Icoil is decreased less.

Therefore, by d the decay mode switching time Tfs prior by one step (prior by one PWM cycle) so as to remove an increase in the charge mode time TON, it is possible to suitably bring the measured current value Icoil close to the reference current value Iref. A process flow for realizing this will be described below with reference to FIGS. 8 to 10.

Figure 8:
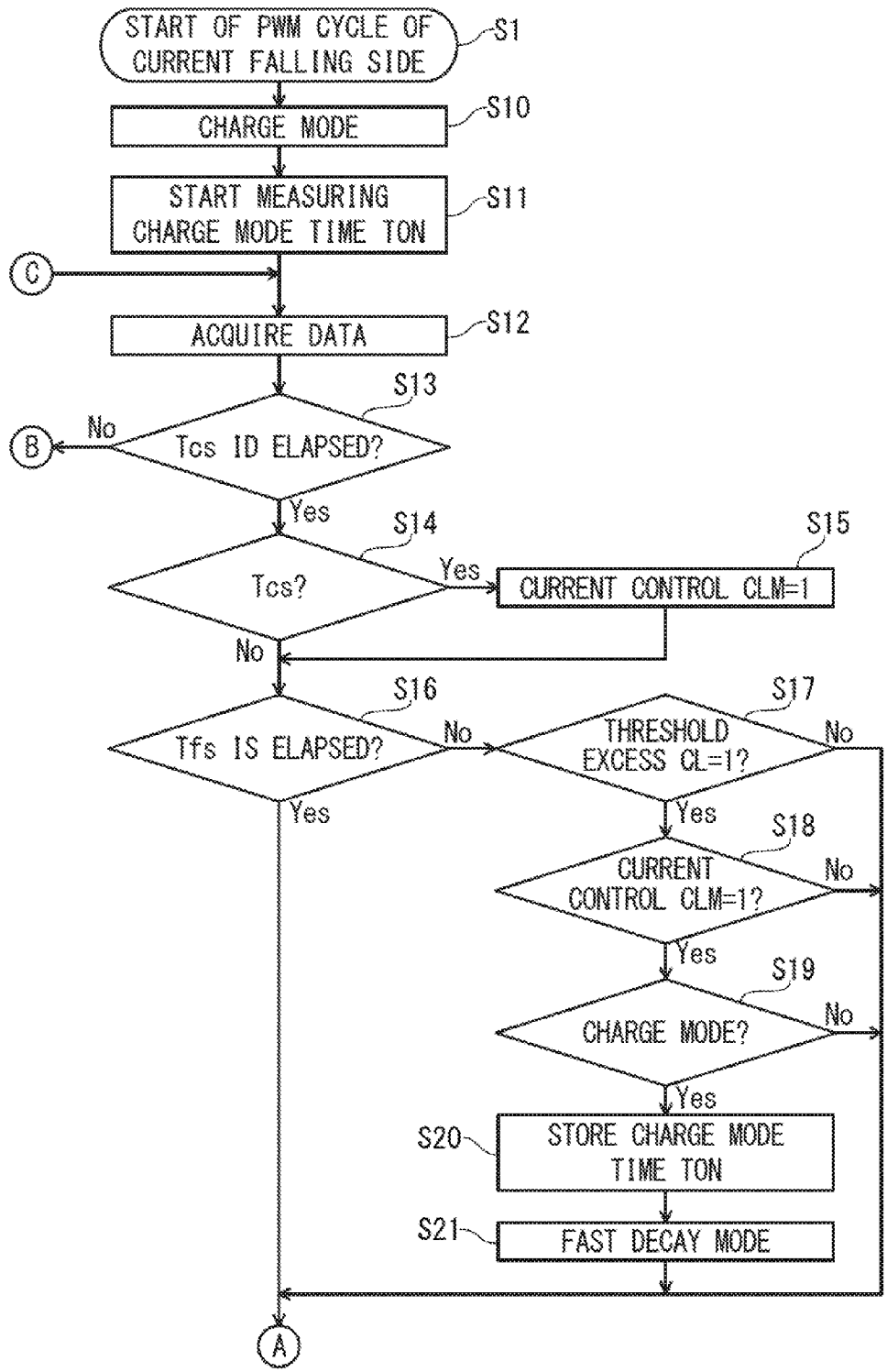
FIG. 8 is a flowchart illustrating a falling side control routine.
Figure 9:
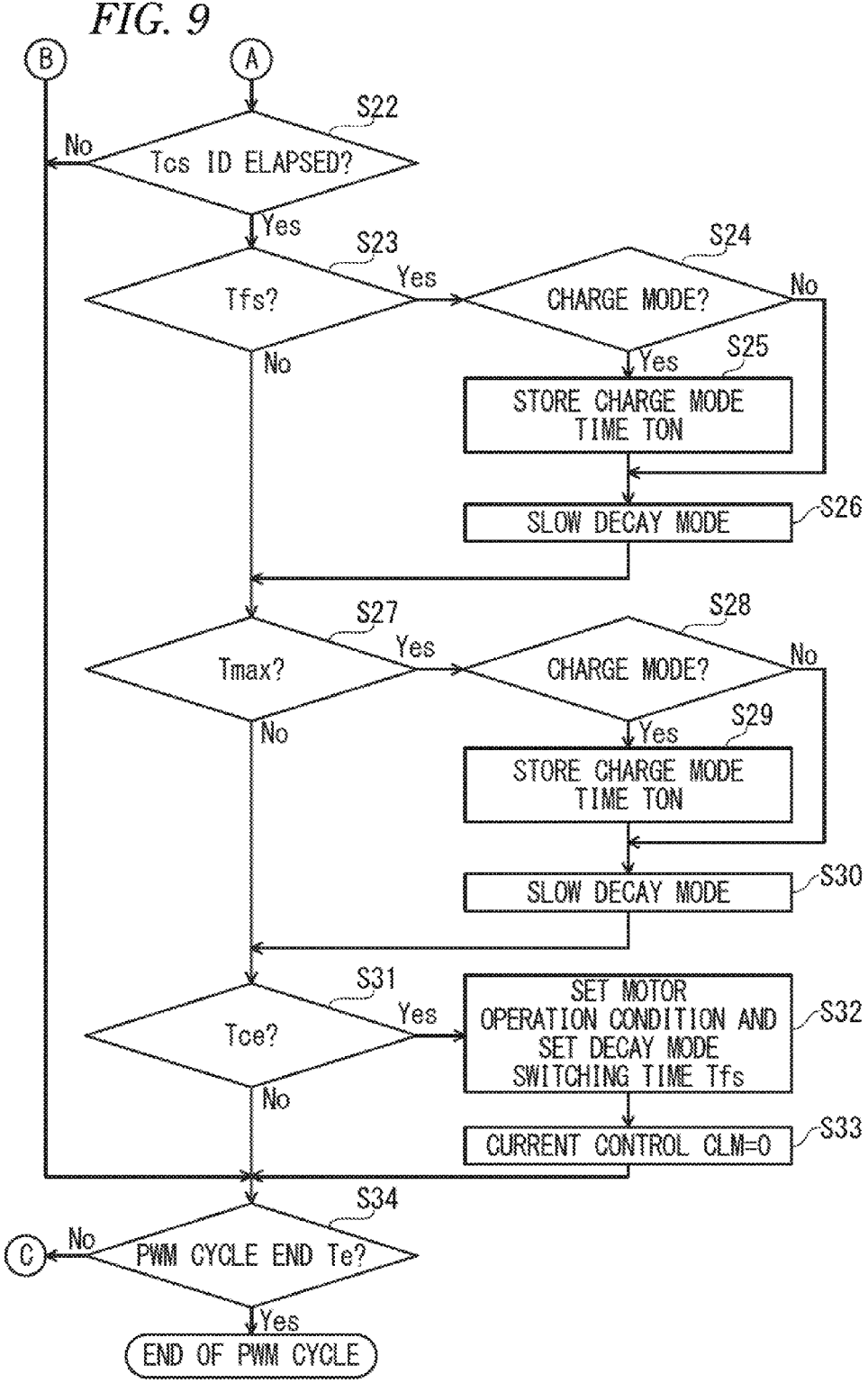
FIG. 9 is a flowchart illustrating the falling side control routine.

FIGS. 8 and 9 are flowcharts illustrating a falling side control routine.

FIGS. 8 and 9 illustrate a control program which is stored in the ROM 103 and is executed by the CPU 101 and which is started every PWM cycle in the falling side.

The falling side control routine is started in step S1 of FIG. 8. In step S1, the timer 104 is reset and then the elapsed time after the PWM cycle starts is counted. In step S1, the reference current value Iref (the reference current value IXref or the reference current value IYref in FIGS. 4A and 4B) in the corresponding PWM cycle is determined based on the estimated value of the rotation angle θ of the rotor 126 and the waveform illustrated in FIG. 4A or 4B, and the determined reference current value Iref is set in the bridge controller 107 (see FIG. 2).

The current control enable flag CLM is set to "0" in the previous PWM cycle. The current control enable flag CLM set in the previous PWM cycle is continuously used in the present PWM cycle. In the previous PWM cycle, the current control enable flag CLM is set to "0" by performing the process of step S33 to be described later. Details of the process of step S33 will be described later.

In step S10, the PWM signal generator 113 causes the H-bridge circuit 20 to operate in the charge mode. In step S11, the bridge controller 107 starts measuring the charge mode time TON.

Then, in step S12, the bridge controller 107 acquires the elapsed time from the timer 104 and the current limit controller 112 acquires the threshold excess flag CL. The elapsed time and the threshold excess flag CL in this routine are not changed until step S12 is performed again.

Steps S13 to S15 are processes of enabling the current control in the time Tcs in FIG. 7. In step S13, the bridge controller 107 determines whether the time Tcs elapses, and moves the routine to step S34 of FIG. 9 when the determination conditions is not satisfied. Through the process of step S10, the H-bridge circuit 20 operates in the charge mode when the PWM cycle starts. Through the process of step S13, the period from the time Ts at which the PWM cycle starts to the time Tcs is a minimum ON time.

When the minimum ON time is not provided, the current waveform may fall greatly. That is, since the ripples of the current waveform increase, the torque loss, the vibration, and the noise of the motor increase. On the contrary, in the embodiment, since the operation mode is set to the charge mode from the time at which the PWM cycle starts to the time Tcs, it is possible to suppress the current ripples of the motor current. Accordingly, it is possible to enhance the driving efficiency of the motor and to reduce the torque loss, the noise, the vibration, and the like of the motor.

The bridge controller 107 determines whether the time Tcs comes in step S14, and sets the current control enable flag CLM to "1" in step S15 when the determination condition is satisfied (YES). The current control enable flag CLM is referred to in step S18 to be described later.

Steps S16 to S21 are processes of switching the charge mode to the fast decay mode after the time Tcs and before the decay mode switching time Tfs in FIG. 7.

The bridge controller 107 determines whether the time Tcs elapses in step S16, and moves the routine to step S22 in FIG. 9 when the determination condition is satisfied (YES).

The current limit controller 112 determines whether the threshold excess flag CL is "1" in step S17, and moves the routine to step S22 in FIG. 9 when the determination condition is not satisfied (NO).

The current limit controller 112 determines whether the current control enable flag CLM is "1" in step S18, and moves the routine to step S22 in FIG. 9 when the determination condition is not satisfied (NO).

Then, the bridge controller 107 determines whether the H-bridge circuit 20 operates in the charge mode in step S19, and moves the routine to step S22 in FIG. 9 when the determination condition is not satisfied (NO).

The bridge controller 107 stores the charge mode time TON in step S20, the PWM signal generator 113 instructs the H-bridge circuit 20 to operate in the fast decay mode in step S21, and the routine moves to step S22 in FIG. 9.

Steps S22 to S26 in FIG. 9 are processes of switching the operation mode from the charge mode or the fast decay mode to the slow decay mode in the decay mode switching time Tfs after the time Tcs in FIG. 7.

The bridge controller 107 determines whether the decay mode switching time Tfs elapses in step S22, and moves the routine to step S34 when the determination condition is not satisfied (NO).

The bridge controller 107 determines whether the decay mode switching time Tfs comes in step S23, and moves the routine to step S27 when the determination condition is not satisfied (NO).

The bridge controller 107 determines whether the H-bridge circuit 20 operates in the charge mode in step S24, and stores the charge mode time TON in step S25 when the determination condition is satisfied (YES).

In step S26, the PWM signal generator 113 instructs the H-bridge circuit 20 to operate in the slow decay mode. Through this process, in the decay mode switching time Tfs in Periods 1 to 4 in FIG. 7, the measured current value Icoil indicated by the solid line is switched from steep decay to slow decay. The decay mode switching time Tfs in the previous falling side is not illustrated in FIG. 7, but for example, in Periods 2 and 4, the measured current value Icoil indicated by the broken line is switched from the steep decay to the slow decay. The switching time is the decay mode switching time Tfs in the previous falling side.

Steps S27 to S30 are processes of switching the operation mode from the charge mode or the fast decay mode to the slow decay mode in the time Tmax after the time Tcs and the decay mode switching time Tfs in FIG. 7.

The bridge controller 107 determines whether the time Tmax comes in step S27, and moves the routine to step S31 when the determination condition is not satisfied (NO).

Then, the bridge controller 107 determines whether the H-bridge circuit 20 operates in the charge mode in step S28, and stores the charge mode time TON in step S29 when the determination condition is satisfied (YES).

In step S30, the PWM signal generator 113 instructs the H-bridge circuit 20 to operate in the slow decay mode. Through this process, in the time Tmax in Period 3 illustrated in FIG. 7, the measured current value Icoil indicated by the broken line is switched from steep decay to slow decay.

Steps S31 to S33 are processes of preparing for a subsequent PWM cycle in the time Tce after the time Tcs and the decay mode switching time Tfs in FIG. 7.

The bridge controller 107 determines whether the time Tce comes in step S31, and moves the routine to step S34 when the determination condition is not satisfied (NO). When the determination condition is satisfied (YES), the bridge controller 107 sets the motor operation condition and the decay mode switching time (see FIG. 10) of the subsequent PWM cycle in step S32, and sets the current control enable flag CLM to "0" in step S33. The current control enable flag CLM set in step S33 is continuously used in the subsequent PWM cycle.

The bridge controller 107 determines whether the time Te at which the present PWM cycle ends comes in step S34, returns the routine to step S12 in FIG. 8 and repeats the process on the present PWM cycle when the determination condition is not satisfied (NO). When the determination condition is satisfied (YES), the bridge controller 107 ends the processes on the present PWM cycle.

Figure 10:
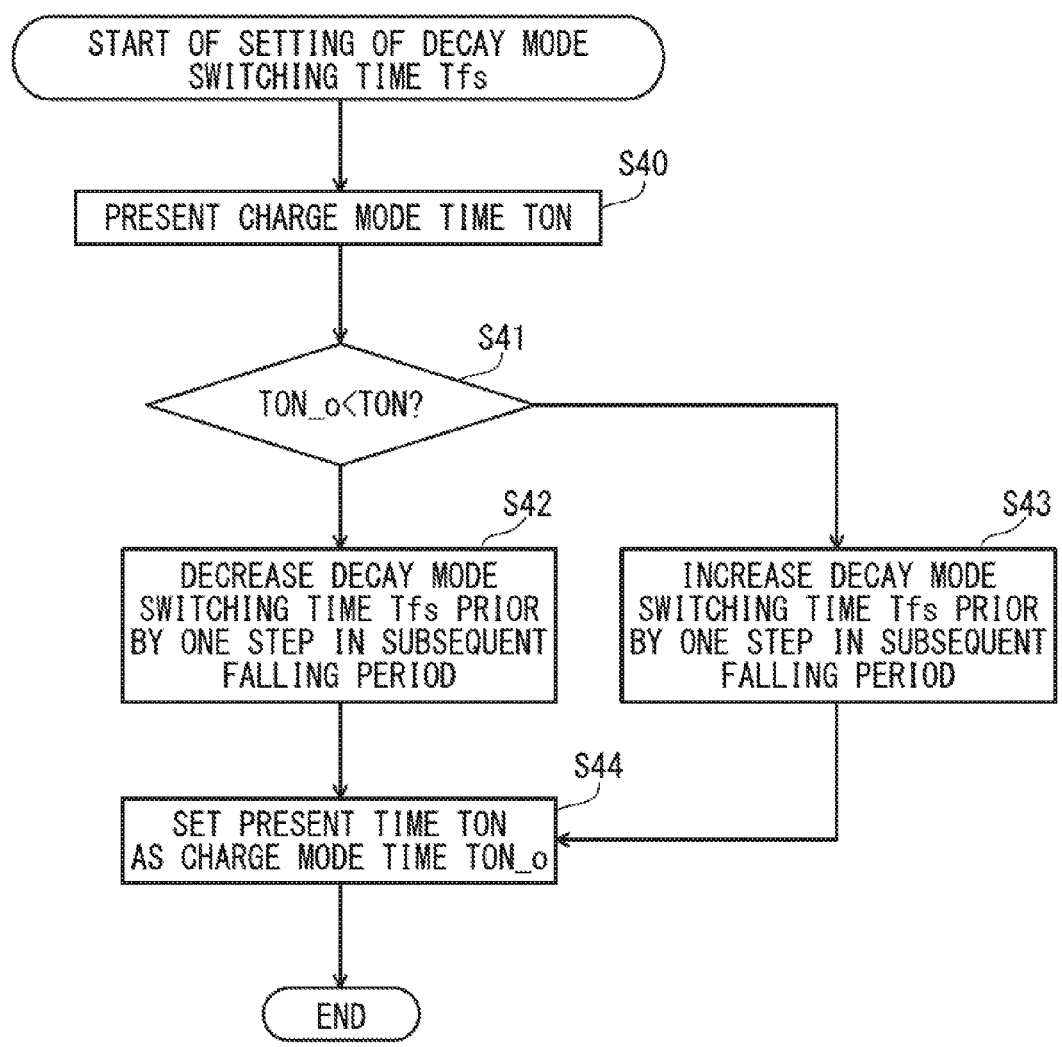
FIG. 10 is a flowchart illustrating a decay mode switching time setting routine.

FIG. 10 is a flowchart illustrating a decay mode switching time setting process. Details of the decay mode switching time setting process which is performed at the same time as performing the motor operation condition setting process of step S32 in FIG. 9.

In step S40, the bridge controller 107 acquires the charge mode time TON of the present PWM cycle.

In step S41, the bridge controller 107 determines whether the charge mode time TON is greater than the charge mode time TON_o of the PWM cycle having the same number as in the previous falling side. The bridge controller 107 moves the routine to step S42 when it is determined that the charge mode time TON is greater than the previous charge mode time TON_o (YES), and moves the routine to step S43 when it is determined that the charge mode time TON is not greater than the previous charge mode time TON_o.

The bridge controller 107 decreases the decay mode switching time Tfs prior by one step in the subsequent falling side by a predetermined amount in step S42, and moves the routine to step S44. The decay mode switching time Tfs prior by one step means that the PWM cycle number is less by one.

In step S43, the bridge controller 107 increases the decay mode switching time Tfs prior by one step in the subsequent falling side by a predetermined amount.

In step S44, the bridge controller 107 sets the charge mode time TON as the charge mode time TON_o. Accordingly, the present charge mode time TON is referred to as the charge mode time TON_o in the subsequent falling side. When the process of step S44 is completed, the bridge controller 107 ends the routine illustrated in FIG. 10.

In the decay mode switching time setting process, the decay mode switching time Tfs prior by one step in the subsequent falling side is changed so as to stabilize the charge mode time TON in the subsequent falling side in comparison with the present falling side. Accordingly, in the subsequent falling side, the measured current value Icoil can be brought close to the reference current value Iref.

Figure 11:
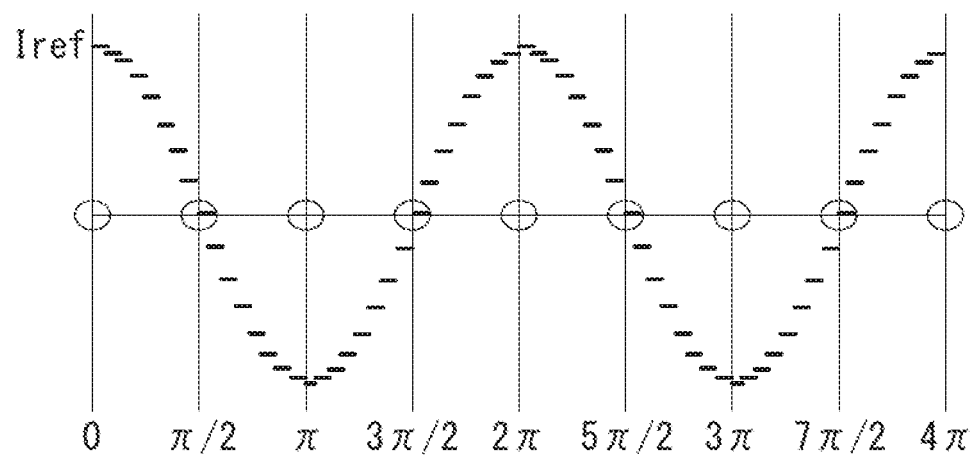
FIG. 11 is a diagram illustrating synchronization of a motor rotation angle with a PWM cycle every 90 degrees.

FIG. 11 is a diagram illustrating an example in which the motor rotation angle θ is synchronized with the PWM cycle every π/2.

The vertical axis of FIG. 11 represents the reference current value Iref. The horizontal axis of FIG. 11 represents the rotation angle θ. Circles in the X axis indicate synchronization of the motor rotation angle θ and the PWM cycle by the motor controller 100.

The motor controller 100 according to the embodiment synchronizes the motor rotation angle θ with the PWM cycle every π/2, that is, 90 degrees. That is, the start point of the PWM cycle is reset every π/2 of the motor rotation angle θ. Accordingly, it is possible to freely set the PWM cycle. The reset timing of the PWM cycle is not particularly limited as long as the timing is based on the π/2 cycle of the motor rotation angle θ.

When the motor rotation angle θ is not synchronized with the PWM cycle, a control delay corresponding to one PWM cycle to the maximum occurs. This delay has an influence until the motor rotation angle θ is synchronized with the PWM cycle again. A case in which different reference current values Iref are set even in the PWM cycles having the same number depending on the motor rotation angle θ occurs due to this delay and thus the charge mode times TON may not be correctly compared.

Figure 12:
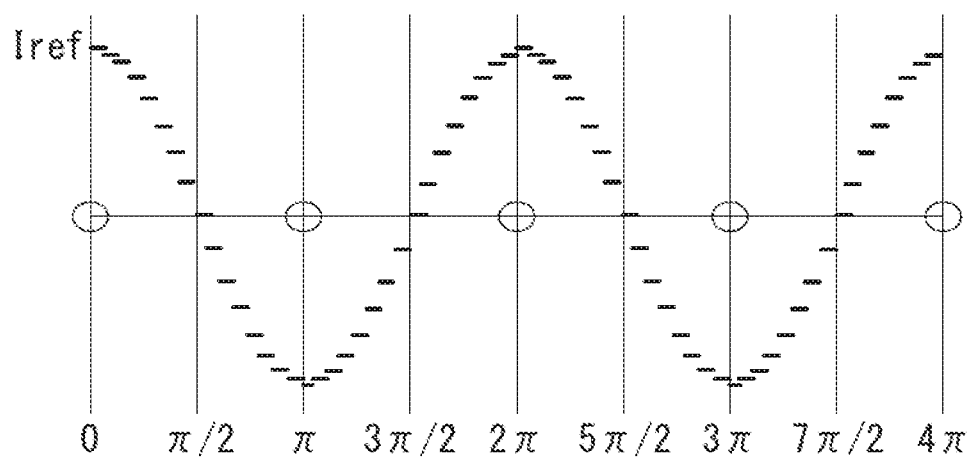
FIG. 12 is a diagram illustrating synchronization of the motor rotation angle with a PWM cycle every 180 degrees.

FIG. 12 is a diagram illustrating a modified example in which the motor rotation angle θ is synchronized with the PWM cycle every π.

The vertical axis of FIG. 12 represents the reference current value Iref. The horizontal axis of FIG. 12 represents the rotation angle θ. Circles in the X axis indicate synchronization of the motor rotation angle θ and the PWM cycle by the motor controller 100.

The motor controller 100 according to the modified example synchronizes the motor rotation angle θ with the PWM cycle every π. That is, the motor rotation angle θ is synchronized with the PWM cycle every 180 degrees. The reset timing of the PWM cycle is not particularly limited as long as the timing is based on the π cycle of the motor rotation angle θ.

Figure 13:
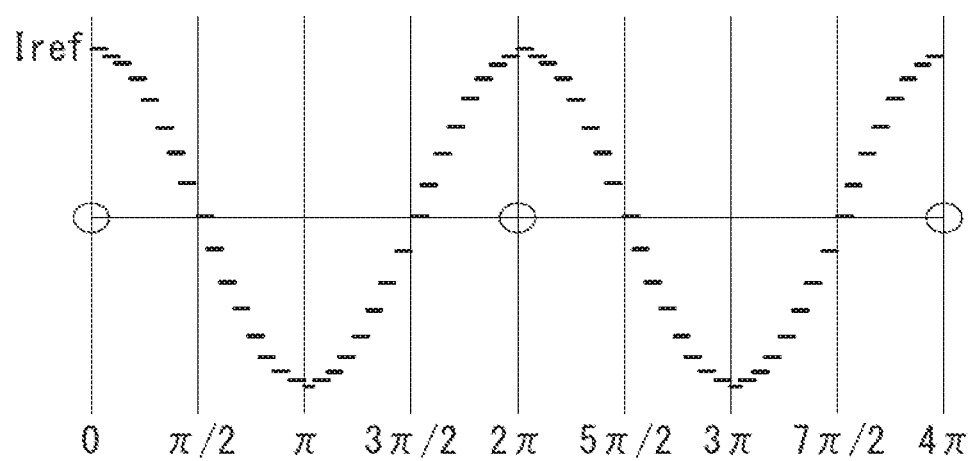
FIG. 13 is a diagram illustrating synchronization of the motor rotation angle with a PWM cycle every 360 degrees.

FIG. 13 is a diagram illustrating a modified example in which the motor rotation angle θ is synchronized with the PWM cycle every 2π.

The vertical axis of FIG. 13 represents the reference current value Iref. The horizontal axis of FIG. 13 represents the rotation angle θ. Circles in the X axis indicate synchronization of the motor rotation angle θ and the PWM cycle by the motor controller 100.

The motor controller 100 according to the modified example synchronizes the motor rotation angle θ with the PWM cycle every 2π, that is, every 360 degrees. The reset timing of the PWM cycle is not particularly limited as long as the timing is based on the 2π cycle of the motor rotation angle θ. Accordingly, it is possible to reduce a load of the process of synchronizing the motor rotation angle θ with the PWM cycle.

The present invention is limited to the above-mentioned embodiments, but can be modified in various forms. The above-mentioned embodiments are only examples for facilitating understanding of the present invention, and the present invention is not limited to the configurations having all the above-mentioned elements. A part of elements of a certain embodiment A can be replaced with the elements of the other embodiment, and the elements of the other embodiment may be added to the configuration of the embodiment A. Some elements of each embodiment may be deleted or may be additionally replaced with other elements. Examples of modifications of the above-mentioned embodiments include the following modes.

(1) The routines are described above as software routines using a program in the above-mentioned embodiments, but may be realized as hardware routines using an application specific integrated circuit (IC) (ASIC), a field-programmable gate array (FPGA), or the like.

(2) The FETs are applied as the switching elements constituting the H-bridge circuit 20 in the above-mentioned embodiments, bipolar transistors, insulated gate bipolar transistors (IGBTs), and other switching elements may be applied instead of the FETs.

(3) A bipolar two-phase stepping motor is applied as the motor 120 in the above-mentioned embodiments, but the type or the number of phases of the motor 120 can vary depending on the application thereof.

(4) The above-mentioned embodiments employ a microstep system as a system of setting the reference current value Iref, but a value continuously varying with respect to the rotation angle θ may be used as the reference current value Iref.

According to the present invention, it is possible to provide a motor current controller and a method for controlling motor current that can suitably control a motor current to follow a target value with a low-cost configuration.

What is claimed is:
1. A motor current controller comprising:
   an H-bridge circuit that includes a switching element and is connected to a motor coil provided in a motor; and
   a control unit that drives the switching element every PWM cycle and designates any operation mode from among a plurality of modes including a charge mode, in which a motor current flowing in the motor coil increases, a fast decay mode, in which the motor current is decreased, and a slow decay mode, in which the motor current is decreased at a speed lower than that in the fast decay mode, for the H-bridge circuit,
wherein the control unit is configured to perform a series of process comprising:
setting a reference current value and a decay mode switching time for each PWM cycle based on a positional relationship between a rotor and a stator;
switching the H-bridge circuit to the charge mode at the time of start of each PWM cycle;
determining whether the motor current is greater than the reference current value;
switching the H-bridge circuit to the fast decay mode and storing a charge mode time when determined that the motor current is greater than the reference current value;
switching the H-bridge circuit to the slow decay mode when the decay mode switching time elapses after a time point at which the H-bridge circuit is switched to the fast decay mode;
comparing the charge mode time of the corresponding PWM cycle in a present falling side with the charge mode time of the PWM cycle having the same number as the corresponding PWM cycle in a previous falling side; and
updating, based on a result of the comparing of the charge modes, the decay mode switching time of the PWM cycle previous to the corresponding PWM cycle in a subsequent falling side.

2. The motor current controller according to claim 1, wherein the control unit is configured to perform the series of process further comprising:
decreasing the decay mode switching time of the PWM cycle previous to the corresponding to the PMW cycle in the subsequent falling side when the charge mode time of the corresponding PWM cycle in the present falling side is longer than the charge mode time of the PWM cycle having the same number as the corresponding PWM cycle in the previous falling side; and
increasing the decay mode switching time of the PWM cycle previous to the corresponding to the PMW cycle in the subsequent falling side when the charge mode time of the corresponding PWM cycle in the present falling side is shorter than the charge mode time of the PWM cycle having the same number as the corresponding PWM cycle in the previous falling side.

3. The motor current controller according to claim 1, wherein the control unit is configured to perform the series of process further comprising:
synchronizing the PWM cycle with every predetermined phase angle of the motor.

4. The motor current controller according to claim 3, wherein the predetermined phase angle is one of angles including $\pi/2$, $\pi$, and $2\pi$.

5. A method for controlling motor current of a motor current controller having an H-bridge circuit that includes a switching element and is connected to a motor coil provided in a motor and a control unit that drives the switching element every PWM cycle and designates any operation mode from among a plurality of modes including a charge mode, in which a motor current flowing in the motor coil increases, a fast decay mode, in which the motor current is decreased, and a slow decay mode, in which the motor current is decreased at a speed lower than that in the fast decay mode, for the H-bridge circuit, the method comprising:
setting a reference current value and a decay mode switching time for each PWM cycle based on a positional relationship between a rotor and a stator;
switching the H-bridge circuit to the charge mode at the time of start of each PWM cycle;
determining whether the motor current is greater than the reference current value;
switching the H-bridge circuit to the fast decay mode and storing a charge mode time when determined that the motor current is greater than the reference current value;
switching the H-bridge circuit to the slow decay mode when the decay mode switching time elapses after a time point at which the H-bridge circuit is switched to the fast decay mode;
comparing the charge mode time of the corresponding PWM cycle in a present falling side with the charge mode time of the PWM cycle having the same number as the corresponding PWM cycle in a previous falling side; and
updating, based on a result of the comparing of the charge modes, the decay mode switching time of the PWM cycle previous to the corresponding PWM cycle in a subsequent falling side.

* * * * *